United States Patent Office 3,740,406
Patented June 19, 1973

3,740,406
DIHYDRO-3 [4-HYDROXY-1-(DI OR TRI-SUBSTITUTED PHENETHYL) - 4 - PIPERIDYL]-2-(3H) FURANONE
Anton Ebnöther, Arlesheim, and Erwin Rissi, Basel, Switzerland, assignors to Sandoz Ltd. (also known as Sandoz AG), Basel, Switzerland
No Drawing. Filed July 20, 1971, Ser. No. 164,452
Claims priority, application Switzerland, July 29, 1970, 11,441/70
Int. Cl. C07d 29/24
U.S. Cl. 260—293.67          13 Claims

ABSTRACT OF THE DISCLOSURE

The invention concerns novel piperidyl-furanone derivatives of the formula:

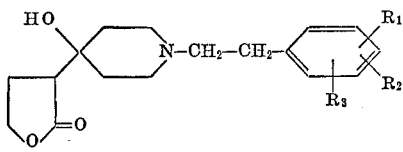

wherein $R_1$ is fluorine, chlorine, bromine, trifluoromethyl, alkyl of 1 to 4 carbon atoms or alkoxy of 1 to 4 carbon atoms,
$R_2$ is chlorine, bromine, fluorine, alkyl of 1 to 4 carbon atoms or alkoxy of 1 to 4 carbon atoms, and
$R_3$ is hydrogen, alkyl of 1 to 4 carbon atoms or alkoxy of 1 to 4 carbon atoms.

A process for their production and intermediates therefor are also described.

The compounds are useful as analgesics.

---

The present invention relates to novel piperidyl-furanone derivatives.

In accordance with the invention there are provided new compounds of Formula I,

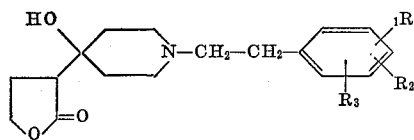

wherein $R_1$ is fluorine, chlorine, bromine, trifluoromethyl, alkyl of 1 to 4 carbon atoms or alkoxy of 1 to 4 carbon atoms,
$R_2$ is chlorine, bromine, fluorine, alkyl of 1 to 4 carbon atoms or alkoxy of 1 to 4 carbon atoms, and
$R_3$ is hydrogen, alkyl of 1 to 4 carbon atoms or alkoxy of 1 to 4 carbon atoms,
and acid addition salts thereof.

Further, in accordance with the invention a compound of Formula I may be obtained by a process comprising (a) Condensing the compound of Formula II

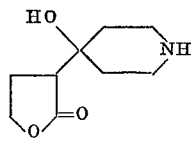

in the presence of an acid-binding agent with a compound of Formula III,

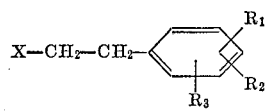

wherein $R_1$, $R_2$ and $R_3$ are as defined above, and X is the acid radical of a reactive ester, or (b) Reacting a compound of Formula IV,

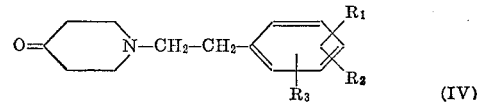

wherein $R_1$, $R_2$ and $R_3$ are as defined above, in the presence of a basic condensation agent, with γ-butyrolactone of Formula V,

and hydrolyzing the resulting reaction product, and, where an acid addition salt is required, converting the resulting compound of Formula I into such salt.

The lower alkyl and alkoxy groups represented by the symbols $R_1$, $R_2$ and $R_3$ preferably contain 1 or 2 carbon atoms.

Process variant (a) is conveniently effected in an inert solvent. Aromatic hydrocarbons such as benzene, toluene or xylene, di(lower)alkyl amides of lower aliphatic monocarboxylic acids such as dimethyl formamide, or chlorinated aliphatic hydrocarbons such as chloroform or carbon tetrachloride may, for example, be used as inert solvents. Alkali metal carbonates such as potassium carbonate or sodium carbonate, tertiary amines such as triethylamine or pyridine, or an excess of the compound of Formula II may, for example, be used as acid-binding agents. In the compounds of Formula III, X may, for example, denote chlorine, iodine or the acid radical of an organic sulphonic acid, e.g. an alkylsulphonyloxy or arylsulphonyloxy radical, but is preferably bromine. The reaction may be accelerated by heating and/or mixing the reaction mixture thoroughly; the reaction is preferably effected at a slightly elevated temperature from 30 to 100° C. and with stirring.

Process variant (b) is conveniently effected in an inert solvent. Liquid ammonia, saturated cyclic ethers such as tetrahydrofuran, or aromatic hydrocarbons such as toluene may, for example, be used as inert solvents. Alkali metal amides such as lithium amide or sodium amide may, for example, be used as basic condensation agents. The reaction temperature is suitably in the range from approximately −35 to +60° C., depending on the solvent used. The reaction is optionally effected under an inert gas atmosphere, e.g. nitrogen, and in the presence of a catalyst, e.g. an organic peroxide such as tert.butyl hydroperoxide, and may, for example, have a duration of 10 to 25 hours. Aqueous solutions of alkali metal carbonates such as potassium carbonate may, for example, be used for the hydrolysis of the reaction product.

The compounds of Formula I may be isolated from the reaction mixture in the usual manner and purified in accordance with known methods.

The compounds of Formula I may be converted into acid addition salts and vice versa in conventional manner.

The compounds of Formula IV may, for example, be obtained by (a') Reacting the corresponding phenethylamine with acrylic acid ethyl ester, subjecting the resulting compound of Formula VI,

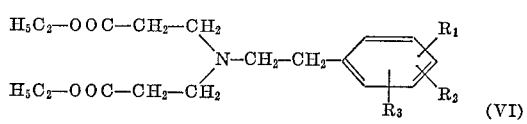

wherein $R_1$, $R_2$ and $R_3$ are as defined above, to a Dieckmann cyclization, saponifying the resulting β-keto ester and subsequently decarboxylating the resulting acid, or (b') Hydrolyzing a compound of Formula VII,

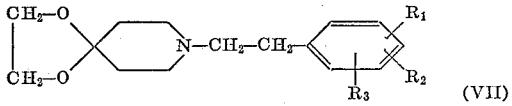

wherein $R_1$, $R_2$ and $R_3$ are as defined above, with a dilute mineral acid.

Dilute hydrochloric acid, sulphuric acid or phosphoric acid may, for example, be used as dilute mineral acid in process (b'); the reaction is conveniently effected at an elevated temperature, preferably at 50° C. to the boiling temperature of the reaction mixture, and has a duration of 2 to 24 hours.

The compounds of Formula VII may be obtained by reacting the compound of Formula VIII

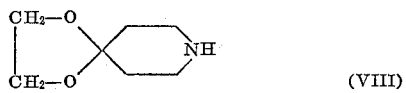

with a compound of Formula III, in an inert solvent and in the presence of an acid-binding agent.

Insofar as the production of the starting materials is not particularly described, these are known or may be produced in accordance with known processes or in a manner analogous to the processes described herein or to known processes.

The compounds of Formula I are useful because they possess pharmacological activity in animals. In particular, the compounds are useful as analgesics as indicated by the hot plate test in mice, the tail pinch test in mice and by an inhibition of the phenylbenzoquinone syndrome in mice.

For the above-mentioned use, the dosage administered will naturally vary depending on the compound employed, mode of administration and treatment desired. However, in general satisfactory results are obtained when administered at a daily dosage of from about 0.4 to about 100 mg./kg. of animal body weight, conveniently given in divided doses 2 to 3 times a day or in sustained release form. For the larger mammals, the total daily dosage is in the range of from about 30 to 300 mg., and dosage forms suitable for oral administration comprise from about 10 to 150 mg. of the compound in association with a solid or liquid pharmaceutical carrier or diluent.

Suitable acids for the formation of pharmaceutically acceptable acid addition salts include mineral acids such as hydrochloric, hydrobromic and sulphuric acid, and organic acids such as fumaric, maleic, tartaric, methane-, ethane- and benzene-sulphonic, citric and malic acid.

The invention also provides a pharmaceutical composition comprising as active agent a compound of Formula I, or a pharmaceutically acceptable acid addition salt thereof, in association with a pharmaceutical carrier or diluent.

In the following non-limitative examples all temperatures are indicated in degrees centigrade and are uncorrected.

EXAMPLE 1

Dihydro-3-[4-hydroxy-1-(3,4-dimethoxyphenethyl)-4-piperidyl]-2(3H)-furanone [process variant (a)]

A solution of 17.0 g. of 3,4-dimethoxyphenethyl bromide in 50 cc. of dimethyl formamide is added dropwise at a temperature of 60° and while stirring to a suspension of 12.8 g. of dihydro-3-(4-hydroxy-4-piperidyl)-2(3H)-furanone and 11.5 g. of potassium carbonate in 100 cc. of dimethyl formamide. The reaction mixture is stirred at 60° for a further 1½ hours and is then poured into approximately 1000 cc. of ice-containing 10% potassium carbonate solution. The reaction product is extracted with chloroform, the extracts are dried over magnesium sulphate and concentrated by evaporation at reduced pressure. The resulting residue is purified by recrystallizing twice from benzene to give the title compound. M.P. 142–143°.

EXAMPLE 2

3-[1-(3,4-dichlorophenethyl)-4-hydroxy-4-piperidyl] dihydro-2(3H)-furanone [process variant (a)]

Dihydro-3-(4-hydroxy-4-piperidyl)-2(3H)-furanone is reacted with 3,4-dichlorophenethyl bromide in accordance with the process described in Example 1. The resulting crude title compound is chromatographed on a 50-fold quantity of silica gel and the fractions eluted with acetone are converted into the hydrogen maleate. M.P. 119–122° (from acetone/ether).

EXAMPLE 3

3-[1-(2,6-dichlorophenethyl)-4-hydroxy-4-piperidyl] dihydro-2(3H)-furanone [process variant (a)]

Dihydro-3-(4-hydroxy-4-piperidyl)-2(3H)-furanone is reacted with 2,6-dichlorophenethyl bromide in accordance with the process described in Example 1. The title compound has a M.P. of 168–169.5° (from ethanol).

EXAMPLE 4

3-{1-[(4 - chloro - 2 - methyl)phenethyl] - 4 - hydroxy-4 - piperidyl}dihydro - 2(3H) - furanone [process variant (a)]

Dihydro-3-(4-hydroxy - 4 - piperidyl)-2(3H)-furanone is reacted with 4-chloro - 2 - methylphenethyl bromide in accordance with the process described in Example 1. The resulting crude title compound is converted into the hydrochloride. M.P. 205–207° (from ethanol).

EXAMPLE 5

3-[1-(2,5-dichlorophenethyl)-4-hydroxy-4-piperidyl]dihydro-2(3H)-furanone [process variant (a)]

Dihydro-3-(4-hydroxy - 4 - piperidyl)-2(3H)-furanone is reacted with 2,5 - dichlorophenethyl bromide in accordance with the process described in Example 1. The resulting crude title compound is chromatographed on a 30-fold quantity of silica gel. The product eluted with a mixture of chloroform/methanol (98.5:1.5) is recrystallized from ether. M.P. 123–124°.

EXAMPLE 6

3-{1-[(3 - fluoro - 4 - methoxy)phenethyl]-4-hydroxy-4 - piperidyl}dihydro - 2(3H) - furanone [process variant (a)]

Dihydro-3-(4-hydroxy - 4 - piperidyl)-2(3H)-furanone is reacted with 3-fluoro - 4 - methoxyphenethyl bromide in accordance with the process described in Example 1. The title compound has a M.P. of 114.5–116° (from ethanol).

EXAMPLE 7

3-{1-[(5 - chloro - 2 - methoxy)phenethyl]-4-hydroxy-4 - piperidyl}dihydro - 2(3H) - furanone [process variant (a)]

A solution of 23.2 g. of methanesulphonic acid (2-methoxy - 5 - chlorophenethyl) ester in 50 cc. of dimethyl formamide is added dropwise at a temperature of 60° and while stirring to a suspension of 16.3 g. of dihydro-3-(4-hydroxy - 4 - piperidyl)-2(3H)-furanone and 14.5 g. of potassium carbonate in 170 cc. of dimethyl formamide. The mixture is allowed to react at 60° for a further 4 hours, is subsequently poured on ice and extracted with methylene chloride. The extracts are dried over magnesium sulphate and concentrated by evaporation, and the resulting residue is dissolved in ethanol and the calculated amount of hydrochloric acid in ethanol is added. Ether is added until the solution is turbid and this is allowed to crystallize. The resulting crude hydrochloride of the title compound is further purified by recrystallizing twice from ethanol. M.P. 203.5–205.5° (decomp.).

EXAMPLE 8

3-{1-[(3 - chloro - 4 - methoxy)phenethyl] - 4 - hydroxy-4 - piperidyl}dihydro - 2(3H) - furanone [process variant (a)]

Dihydro-3-(4-hydroxy - 4 - piperidyl)-2(3H)-furanone and methanesulphonic acid (3-chloro - 4 - methoxyphenethyl) ester are reacted together in accordance with the process described in Example 7. The title compound has a M.P. of 125–126° (from ethanol).

EXAMPLE 9

3-{1-[(2 - chloro - 5 - methoxy)phenethyl] - 4 - hydroxy-4 - piperidyl}dihydro - 2(3H) - furanone [process variant (a)]

Methanesulphonic acid (2-chloro-5-methoxyphenethyl) ester and dihydro - 3 - (4-hydroxy - 4 - piperidyl)-2(3H)-furanone are reacted together in accordance with the process described in Example 7. The title compound has a M.P. of 133–134° (from ethanol).

EXAMPLE 10

Dihydro-3-[4-hydroxy-1-(3,5-dimethoxyphenethyl)-4-piperidyl]-2(3H)-furanone [process variant (a)]

Methanesulphonic acid (3,5-dimethoxyphenethyl) ester and dihydro - 3 - (4-hydroxy-4-piperidyl)-2(3H)-furanone are reacted together in accordance with the process described in Example 7. The hydrochloride of the title compound has a M.P. of 209–210° (from methanol).

EXAMPLE 11

Dihydro-3-[4-hydroxy-1-(2,4,6-trimethylphenethyl)-4-piperidyl]-2(3H)-furanone [process variant (a)]

Methanesulphonic acid (2,4,6 - trimethylphenethyl) ester and dihydro-3-(4 - hydroxy - 4 - piperidyl)-2(3H)-furanone are reacted together in accordance with the process described in Example 7. The hydrochloride of the title compound has a M.P. of 256–257° (from methanol).

EXAMPLE 12

Dihydro-3-[4-hydroxy-1-(3,4,5-trimethoxyphenethyl)-4-piperidyl]-2(3H)-furanone [process variant (a)]

Methanesulphonic acid (3,4,5 - trimethoxyphenethyl) ester and dihydro - 3 - (4-hydroxy - 4 - piperidyl)-2(3H)-furanone are reacted together in accordance with the process described in Example 7. The hydrochloride of the title compound has a M.P. of 207–209° (decomp., from ethanol).

EXAMPLE 13

Dihydro-3-[4-hydroxy-1-(3,4-dimethoxyphenethyl)-4-piperidyl]-2(3H)-furanone [process variant (b)]

A mixture of 105 g. of γ-butyrolactone and 65 g. of 1-(3,4 - dimethoxyphenethyl) - 4 - piperidone is added dropwise at —10° to a suspension of 56 g. of sodium amide in 500 cc. of absolute toluene. The reaction mixture is allowed to react over night at —10° and is subsequently decomposed with water while cooling with ice. The aqueous phase is separated and again extracted twice with toluene. The combined toluene extracts are dried over magnesium sulphate, the solvent is removed by evaporation at reduced pressure and the resulting residue is recrystallized thrice from benzene. M.P. 142–143°.

What is claimed is:
1. A compound of the formula:

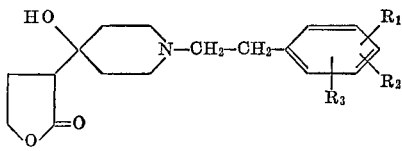

wherein
R₁ is fluorine, chlorine, bromine, trifluoromethyl, alkyl of 1 to 4 carbon atoms or alkoxy of 1 to 4 carbon atoms,
R₂ is chlorine, bromine, fluorine, alkyl of 1 to 4 carbon atoms or alkoxy of 1 to 4 carbon atoms, and
R₃ is hydrogen, alkyl of 1 to 4 carbon atoms or alkoxy of 1 to 4 carbon atoms, or a pharmaceutically acceptable acid addition salt thereof.

2. The compound of claim 1, which is dihydro-3-[4-hydroxy-1-(3,4-dimethoxyphenethyl)-4-piperidyl]-2(3H)-furanone.

3. The compound of claim 1, which is 3-[1-(3,4-dichlorophenethyl)-4-hydroxy-4-piperidyl] dihydro-2(3H)-furanone.

4. The compound of claim 1, which is 3-[1-(2,6-dichlorophenethyl)-4-hydroxy-4-piperidyl] dihydro-2(3H)-furanone.

5. The compound of claim 1, which is 3-{1-[(4-chloro-2-methyl)phenethyl] - 4-hydroxy-4-piperidyl}dihydro-2(3H)-furanone.

6. The compound of claim 1, which is 3-[1-(2,5-dichlorophenethyl)-4-hydroxy-4-piperidyl] dihydro-2(3H)-furanone.

7. The compound of claim 1, which is 3-{1-[(3-fluoro-4-methoxy)phenethyl]-4-hydroxy - 4 - piperidyl}dihydro-2(3H)furanone.

8. The compound of claim 1, which is 3-{1-[(5-chloro-2-methoxy)phenethyl]-4-hydroxy - 4 - piperidyl}dihydro-2(3H)-furanone.

9. The compound of claim 1, which is 3-{1-[(3-chloro-4-methoxy)phenethyl]-4-hydroxy - 4 - piperidyl}dihydro-2(3H)-furanone.

10. The compound of claim 1, which is 3-{1-[(2-chloro-5-methoxy)phenethyl]-4-hydroxy - 4 - piperidyl}dihydro-2(3H)-furanone.

11. The compound of claim 1, which is dihydro-3-[4-hydroxy-1-(3,5-dimethoxyphenethyl)-4-piperidyl]-2(3H)-furanone.

12. The compound of claim 1, which is dihydro-3-[4-hydroxy - 1 - (2,4,6-trimethylphenethyl) - 4 - piperidyl]-2(3H)-furanone.

13. The compound of claim 1, which is dihydro-3-[4-hydroxy-1-(3,4,5 - trimethoxyphenethyl) - 4 - piperidyl]-2(3H)-furanone.

References Cited
FOREIGN PATENTS 2,033,852  1/1971  Germany _____ 260—293.67

HENRY R. JILES, Primary Examiner

S. D. WINTERS, Assistant Examiner

U.S. Cl. X.R.

260—293.66, 293.8, 343.6, 471 A; 424—267